United States Patent
Kurata et al.

(10) Patent No.: US 11,195,513 B2
(45) Date of Patent: *Dec. 7, 2021

(54) GENERATING PHONEMES OF LOAN WORDS USING TWO CONVERTERS

(71) Applicant: INTERNATIONAL BUSINESS MACHINES CORPORATION, Armonk, NY (US)

(72) Inventors: Gakuto Kurata, Tokyo (JP); Toru Nagano, Tokyo (JP); Yuta Tsuboi, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/717,194

(22) Filed: Sep. 27, 2017

(65) Prior Publication Data

US 2019/0096388 A1 Mar. 28, 2019

(51) Int. Cl.
| G10L 15/02 | (2006.01) |
| G10L 15/16 | (2006.01) |
| G10L 15/22 | (2006.01) |
| G10L 15/14 | (2006.01) |

(Continued)

(52) U.S. Cl.
CPC ............ G10L 15/02 (2013.01); G06F 40/129 (2020.01); G06F 40/242 (2020.01);
(Continued)

(58) Field of Classification Search
CPC ....... G10L 15/02; G10L 15/063; G10L 15/14; G10L 15/16; G10L 15/187; G10L 15/22
(Continued)

(56) References Cited

U.S. PATENT DOCUMENTS 7,406,417 B1 * 7/2008 Hain .................. G10L 13/08
704/260
9,135,912 B1 * 9/2015 Strope .................. G10L 15/187
(Continued)

FOREIGN PATENT DOCUMENTS

| CN | 1938756 A | 3/2007 |
| CN | 105590623 A | 5/2016 |
| JP | 2002207728 A | 7/2002 |

OTHER PUBLICATIONS

Henrich, Peter. "Language identification for the automatic grapheme-to-phoneme conversion of foreign words in a German text-to-speech system." EUROSPEECH. (Year: 1989).*

(Continued)

*Primary Examiner* — Richemond Dorvil
*Assistant Examiner* — Rodrigo A Chavez
(74) *Attorney, Agent, or Firm* — Tutunjian & Bitetto, P.C.; Randall Bluestone

(57) ABSTRACT

A technique for estimating phonemes for a word written in a different language is disclosed. A sequence of graphemes of a given word in a source language is received. The sequence of the graphemes in the source language is converted into a sequence of phonemes in the source language. One or more sequences of phonemes in a target language are generated from the sequence of the phonemes in the source language by using a neural network model. One sequence of phonemes in the target language is determined for the given word. Also, technique for estimating graphemes of a word from phonemes in a different language is disclosed.

12 Claims, 8 Drawing Sheets

(51) Int. Cl.
*G10L 15/187* (2013.01)
*G10L 15/06* (2013.01)
*G06N 3/04* (2006.01)
*G06N 3/08* (2006.01)
*G06F 40/129* (2020.01)
*G06F 40/242* (2020.01)
*G10L 13/08* (2013.01)

(52) U.S. Cl.
CPC ........... *G06N 3/0445* (2013.01); *G06N 3/084* (2013.01); *G10L 15/063* (2013.01); *G10L 15/14* (2013.01); *G10L 15/16* (2013.01); *G10L 15/22* (2013.01); *G10L 13/08* (2013.01); *G10L 15/187* (2013.01); *G10L 2015/025* (2013.01)

(58) Field of Classification Search
USPC ......................................................... 704/232
See application file for complete search history.

(56) References Cited

U.S. PATENT DOCUMENTS

| | | | | |
|---|---|---|---|---|
| 2002/0046025 | A1* | 4/2002 | Hain | G10L 13/08 704/243 |
| 2004/0039570 | A1* | 2/2004 | Harengel | G10L 13/08 704/232 |
| 2007/0112569 | A1* | 5/2007 | Wang | G10L 13/08 704/260 |
| 2008/0147405 | A1* | 6/2008 | Qing | G10L 13/10 704/258 |
| 2011/0035219 | A1* | 2/2011 | Kadirkamanathan | G10L 15/005 704/239 |
| 2011/0218796 | A1* | 9/2011 | Suzuki | G06F 40/40 704/2 |
| 2015/0186359 | A1* | 7/2015 | Fructuoso | G10L 13/08 704/8 |
| 2016/0358596 | A1* | 12/2016 | Singh | G10L 13/08 |
| 2017/0287474 | A1* | 10/2017 | Maergner | G06F 40/211 |
| 2018/0293228 | A1* | 10/2018 | Tarakji | G06F 40/284 |

OTHER PUBLICATIONS

Yao, "Sequence to Sequence Neural Net Models for Grapheme-to-Phoneme Conversion" arXiv: 1506.00196, Aug. 2015, pp. 1-5.
Allowance and Fees Due issued in corresponding U.S. Appl. No. 15/801,820 dated May 28, 2021 (25 pgs).
International Search Report issued in PCTIB2018057353 dated Jan. 21, 2019, 9 pages.

* cited by examiner

GENERATING PHONEMES OF LOAN WORDS USING TWO CONVERTERS

BACKGROUND

Technical Field

The present disclosure, generally, relates to conversion between graphemes and phonemes across different languages, more particularly, to techniques for estimating phonemes for a word written in a different language and techniques for estimating graphemes of a word from phonemes in a different language.

Description of the Related Art

Grapheme-to-phoneme (G2P) conversion is a task of finding a reading of a word from its written form. The G2P conversion is used in Text-to-Speech (TTS) conversion, in which the TTS system converts a text from its written form into its phonemes by using the G2P system with a dictionary. The G2P conversion is also used in Speech-to-Text (STT) conversion, in which the STT system assigns phonemes to an unknown word in the given training data by using the G2P system.

Recently, a sequence-to-sequence neural network model has been applied to the G2P conversion (K. Yao, et al. Sequence-to-Sequence Neural Net Models for Grapheme-to-Phoneme Conversion. in Proceedings of INTERSPEECH, 2015). According to this literature, it is mentioned that sequence-to-sequence translation methods based on generation with a side-conditioned language model had shown promising results in several tasks, including machine translation and image captioning. It has been found that a simple side-conditioned generation approach is able to rival a state-of-the-art of G2P conversion, and it can significantly advance the stat-of-the-art with bi-directional long short-term memory (LSTM) neural networks that use the alignment information.

Generally, relationships between graphemes and corresponding phonemes for common words are already listed in the TTS/STT dictionary. However, most of loanwords are unknown word for the TTS/STT dictionary. It is difficult that the dictionary covers phonemes of all loanwords; because the loanwords can be possibly include all words in all languages, and new words would be born one after another and incorporated into another language.

What is needed is computer-implemented methods, associated computer systems and computer program products, capable of estimating reasonable phonemes for a word written in a different language with high accuracy even when the size of the dictionary that can be prepared is relatively small.

SUMMARY

According to an embodiment of the present invention, there is provided a computer-implemented method for estimating phonemes for a word written in a different language. The method includes receiving a sequence of graphemes of a given word in a source language. The method also includes converting the sequence of the graphemes in the source language into a sequence of phonemes in the source language. The method further includes generating one or more sequences of phonemes in a target language from the sequence of the phonemes in the source language by using a neural network model. The method includes further determining one sequence of phonemes in the target language for the given word.

According to the method of the embodiment of the present invention, the sequence of phonemes in the target language can be estimated for a word written in the source language with high accuracy even when the size of the available dictionary is relatively small.

In one embodiment, the one or more sequences of the phonemes include a plurality of sequences of phonemes. The method further includes evaluating a score for each sequence of the phonemes in the target language by using a language model of the target language. The score for each sequence of the phonemes is used to determine the one sequence of the phonemes from among the plurality of the sequences of the phonemes. Since a linguistically unacceptable sequence of the phonemes in the target language that is generated from the sequence of the phonemes in the source language can be excluded from the result, accuracy of the estimation can be improved.

In another embodiment, the sequence of the graphemes in the source language is converted by a first sequence-to-sequence converter to the sequence of the phonemes in the source language. Accuracy of conversion from graphemes to phonemes in the source language can be improved, which leads improvement on accuracy of the estimation.

In yet another embodiment, the first sequence-to-sequence converter is trained by using a first dictionary registering relationships between a set of graphemes and a set of phonemes in the source language. The sequence of the phonemes in the target language can be estimated by leveraging knowledge of the first dictionary, which is generally abundant.

In one embodiment, the neural network model is a second sequence-to-sequence converter for converting the sequence of the phonemes in the source language into the one or more sequences of the phonemes in the target language. Accuracy of conversion from phonemes in the source language into phonemes in the target language can be improved, which leads improvement on accuracy of the estimation.

In another embodiment, the second sequence-to-sequence converter is trained by using a second dictionary registering relationships between a set of graphemes in the source language and a set of phonemes in the target language, and a first dictionary registering relationships between a set of graphemes and a set of phonemes in the source language. Even though there is no dictionary for direct conversion, training data including pairs of a set of phonemes in the source language and a set of phonemes in the target language can be generated from existing dictionary. Even when the size of the second dictionary is not large, dividing estimation process into multiple conversions would improve the accuracy of the estimation.

According to other embodiment of the present invention, there is provided a computer-implemented method for estimating graphemes of a word from phonemes in a different language. The method includes receiving a sequence of phonemes in a source language. The method also includes generating one or more sequences of phonemes in a target language from the sequence of the phonemes in the source language by using a neural network model. The method further includes converting at least one sequence of the phonemes in the target language into at least one sequence of graphemes in the target language. The method includes further identifying a target word written in the target language for the sequence of the phonemes in the source language.

According to the method of the other embodiment of the present invention, graphemes of a word written in the target language can be estimated from phonemes in the source language with higher accuracy even when the size of the available dictionary is relatively small.

In one embodiment, the at least one sequence of the graphemes includes a plurality of sequences of graphemes. The method further includes evaluating a score for each sequence of the graphemes in the target language by using a language model of the target language. The score for each sequence of the graphemes is used to determine one sequence of the graphemes as the target word from among the plurality of the sequences of the graphemes. Since a linguistically unacceptable sequence of the graphemes in the target language can be excluded from the result, accuracy of the estimation can be improved.

Computer systems and computer program products relating to one or more aspects of the present invention are also described and claimed herein.

Additional features and advantages are realized through the techniques of the present invention. Other embodiments and aspects of the invention are described in detail herein and are considered a part of the claimed invention.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
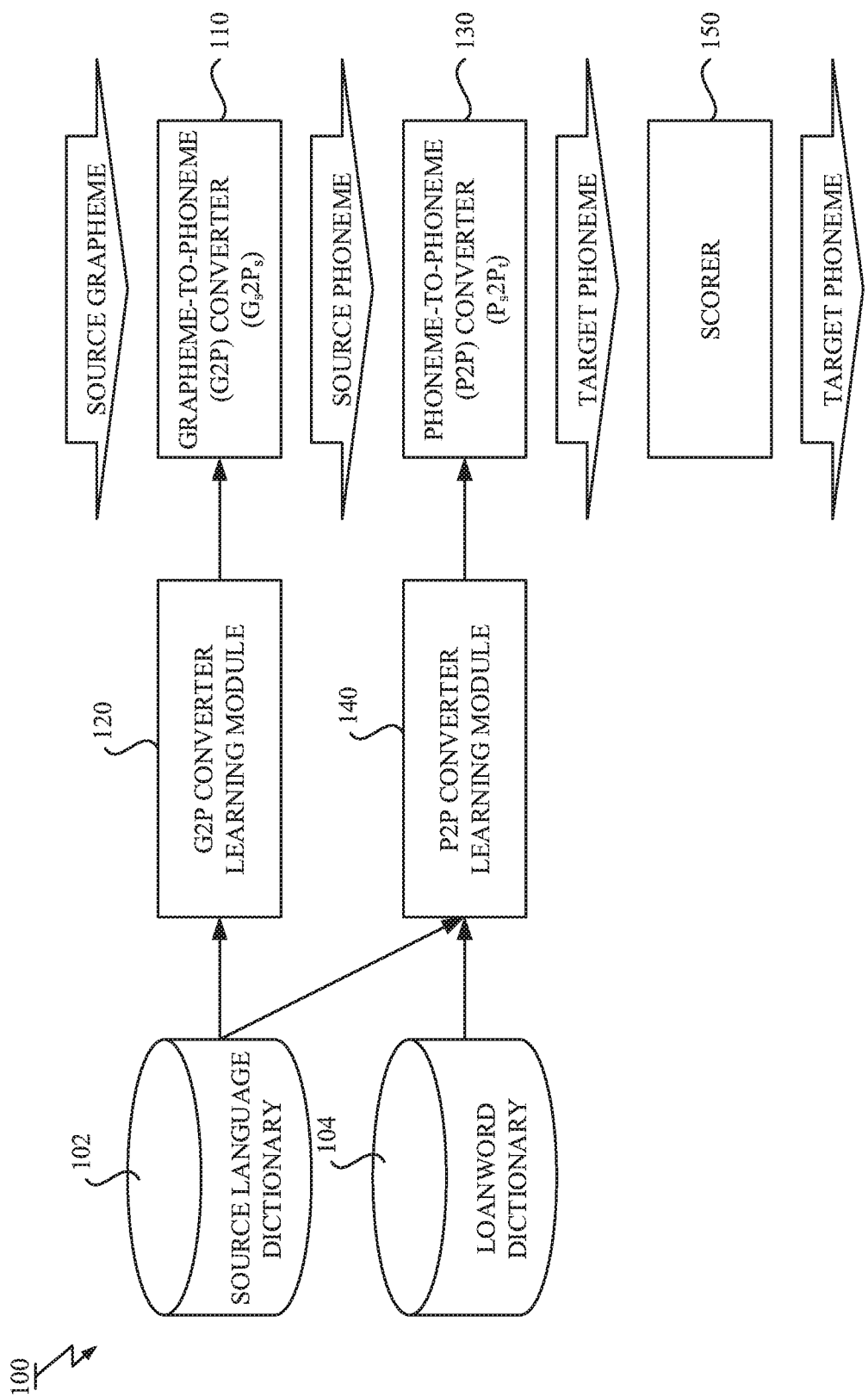
FIG. 1 illustrates a block diagram of a grapheme-to-phoneme conversion system according to an exemplary embodiment of the present invention.

Now, the present invention will be described using particular embodiments, and the embodiments described hereafter are understood to be only referred to as examples and are not intended to limit the scope of the present invention.

One or more embodiments according to the present invention are directed to computer-implemented methods, computer systems and computer program products for estimating phonemes for a word written in a different language. One or more other embodiments according to the present invention are directed to computer-implemented methods, computer systems and computer program products for estimating graphemes of a word from phonemes in a different language.

A task of finding a reading of a word from its written form, which is referred to as a grapheme-to-phoneme conversion, is often used in natural language processing, including Text-to-Speech (TTS) conversion, Speech-to-Text (STT) conversion, etc. In the grapheme-to-phoneme conversion, accurate estimation of readings for words is demanded. However, the accuracy of the grapheme-to-phoneme conversion degrades for certain kinds of words. In some language, a loanword, which is a word imported from an original language without translation, is sometimes written in the original language in its context. For example, in a context of Japanese sentence, English words (e.g., company names, brand names, and new technical terms) often appear in the form of English notation. Generally, a dictionary for grapheme-to-phoneme conversion is prepared in a phoneme system of the same language. Therefore, there is no large corpus that gives Japanese style readings for loanwords written in the different language such as English. Since such loanwords can possibly include all words in all languages and new words would be born one after another and imported from other language, it is difficult to prepare a comprehensive dictionary that fully covers phonemes of all loanwords.

First, referring to the series of FIGS. 1-4, a computer system and a method for estimating phonemes for a word written in a different language according to an exemplary embodiment of the present invention, in which phonemes in a target language is estimated from graphemes for a given word written in a source language by plural conversions, will be described.

Also an inverse conversion of the grapheme-to-phoneme conversion is useful for non-native peoples to identify a word written in a foreign language (e.g. English) from a reading in a local language (e.g., Japanese) when the people do not know the spelling of the word in the foreign language but know a rough meaning of the word.

Then, referring to the series of FIGS. 5-7, a computer system and a method for estimating graphemes of a word from phonemes in a different language according to other exemplary embodiment of the present invention, in which graphemes of a word written in a target language are estimated from given phonemes in a source language by plural conversions, will be described.

With reference to FIG. 1, there is described a block diagram of a grapheme-to-phoneme conversion system 100 according to an exemplary embodiment of the present invention. As shown in FIG. 1, the grapheme-to-phoneme conversion system 100 may include a grapheme-to-phoneme (G2P) converter 110 for converting graphemes in a source language (hereinafter, referred to as "source graphemes") into phonemes in the source language (hereinafter, referred to as "source phonemes"); a phoneme-to-phoneme (P2P) converter 130 for converting source phonemes into phonemes in a target language (hereinafter, referred to as "target phonemes"); and a scorer 150 for scoring sequences of target phonemes obtained from the P2P converter 130 to determine one sequence of target phonemes as a result.

The G2P converter 110 may be a sequence-to-sequence converter that is configured to convert a sequence of source graphemes into a sequence of source phonemes. The sequence-to-sequence converter is a neural network model that converts one sequence into another sequence by its neural network structure, which may include a recurrent neural network. The G2P converter 110 receives the sequence of the source graphemes of a given word and converts the sequence of the source graphemes into the sequence of the source phonemes. The sequence of the source phonemes generated by the G2P converter 110 is passed to the P2P converter 130. In the exemplary embodiment, one best sequence of source phonemes is generated from one sequence of source graphemes. However, in another embodiment, N best sequences of source phonemes may be generated from one sequence of source graphemes.

The P2P converter 130 may be a sequence-to-sequence converter that is configured to convert a sequence of source phonemes into a sequence of target phonemes. The P2P converter 130 receives the sequence of the source phonemes from the G2P converter 110 and generates one or more sequences of target phonemes from the sequence of the source phonemes. The one or more sequences of the target phonemes generated by the P2P converter 130 are passed to the scorer 150. In the exemplary embodiment, N best sequences of target phonemes are generated from one sequence of source phonemes. However, in another embodiment, one best sequence of target phonemes may be generated from one sequence of source phonemes.

Figure 2:
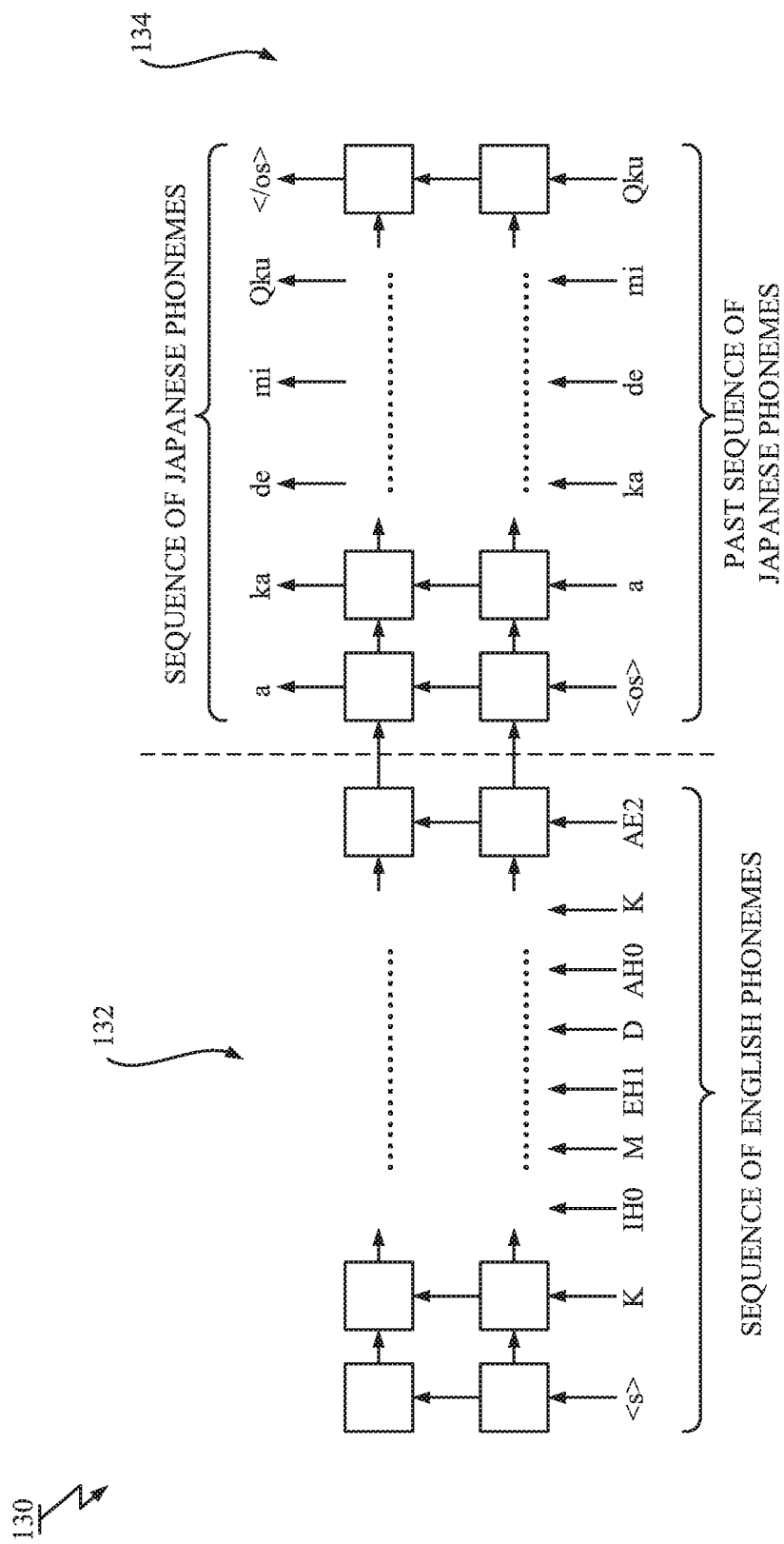
FIG. 2 illustrates an exemplary architecture of a phoneme-to-phoneme converter ($P_s 2P_t$) according to one embodiment of the present invention.

An exemplary architecture of the P2P converter 130 is illustrated in FIG. 2. The architecture shown in FIG. 2 indicates an encoder-decoder LSTM (Long and Short Term Memory) model with two layers for a conversion from a sequence of English phonemes to a sequence of Japanese phonemes.

As shown in FIG. 2, the P2P converter 130 includes an encoder 132 that reads a sequence of source phonemes and maps the sequence into a vector; and a decoder 134 that predicts a next sequence of target phonemes conditioned on the vector by using a past sequence of target phonemes. Note that the sequence of the source phonemes may be time reversed. Also the <s> denotes a source side sentence beginning token, and the <os> and </os> denotes the target side sentence begin and end symbols in FIG. 2. A beam search decoder may be used to generate an output sequence of the target phonemes during the decoding phase. In the particular embodiment, sequences of target phonemes with N highest posterior probabilities are selected as the decoding result. In another embodiment, a sequence of target phonemes with the highest posterior probability is selected as the decoding result of the P2P converter 130.

The encoder-decoder LSTM model shown in FIG. 2 may also be used as the G2P converter 110. In the particular embodiment, one sequence with the highest posterior probability is selected as the decoding result of the G2P converter 110.

Note that the architecture of the sequence-to-sequence converter shown in FIG. 2 is an example and the architecture is not limited to the encoder-decoder LSTM model shown in FIG. 2. Other models that leverage alignment information, which may include a uni-directional LSTM model and a bi-directional LSTM model, can also be employed. Furthermore, instead of using LSTM cells, simple Recurrent Neural Network (RNN) cells or Gated Recurrent Unit (GRU) cells may also be used.

Referring back to FIG. 1, the scorer 150 is a language model of (to be more precise, "phoneme of") the target language, and is configured to score one or more sequences of target phonemes obtained from the P2P converter 130 and to determine one plausible sequence of the target phonemes as a result. In one embodiment, the language model can be created from readings registered in a dictionary of the target language (e.g., a, a I, a i a i g as a, etc. in Japanese dictionary) and evaluate likelihood of reading in the target language. The scorer 150 evaluates a score for each sequence of target phonemes. The scorer 150 outputs occurrence probability of a given sequence of target phonemes as the score. Lower probability indicates that the sequence of the target phonemes is more linguistically unacceptable. The evaluated score for each sequence is used to determine the one best sequence for the given word from among the N best sequences.

In one embodiment, the language model of the scorer 150 is a neural network based model such as a RNN language model. However, in another embodiment, exponential language models and n-gram language models may also be contemplated. The language model of the scorer 150 can be trained by using appropriate algorithm with existing corpus depending on its architecture. For example, the RNN language model can be trained by using a backpropagation through time (BPTT) algorithm.

Since a linguistically unacceptable sequence of the target phonemes that is generated by the P2P converter 130 from the sequence of the source phonemes can be excluded from the result, accuracy of the estimation can be improved.

Further referring to FIG. 1, the grapheme-to-phoneme conversion system 100 may further include a source language dictionary 102 that registers relationship between a set of source graphemes and a set of source phonemes for each word; a loanword dictionary 104 that registers relationship between a set of source graphemes and a set of target phonemes for each loanword; a G2P converter learning module 120 for learning the G2P converter 110 by using the source language dictionary 102; and a P2P converter learning module 140 for learning the P2P converter 130 by using the loanword dictionary 104 together with the source language dictionary 102.

Figure 3:
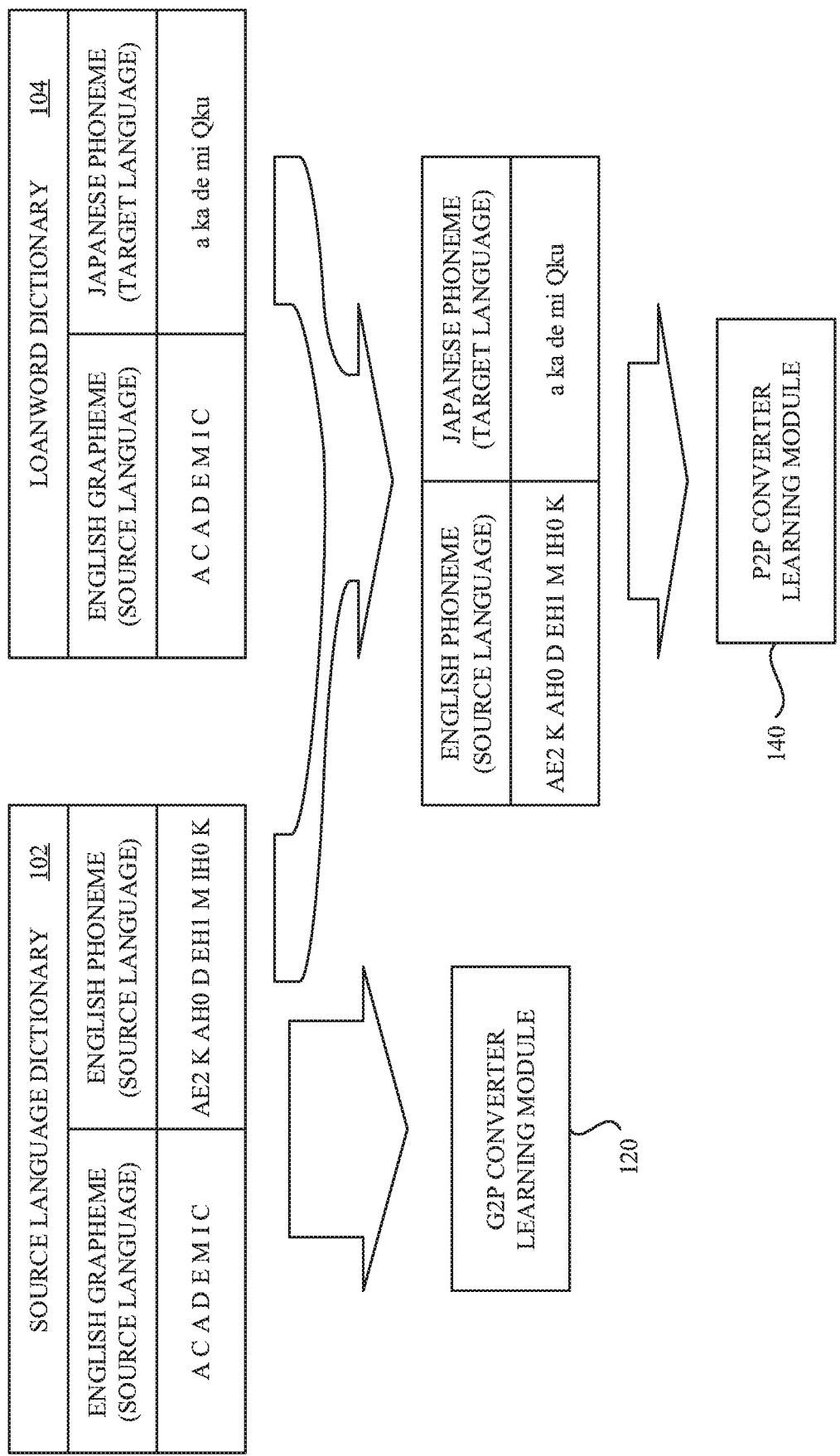
FIG. 3 describes a way of preparing training data for converters in the grapheme-to-phoneme conversion system according to the exemplary embodiment of the present invention.

With reference to FIG. 3, a way of preparing training data for sequence-to-sequence converters is described. As shown in FIG. 3, there are two dictionaries including the source language dictionary 102 and the loanword dictionary 104.

In the example shown in FIG. 3, the source language dictionary 102 is an English reading dictionary of English words. The source language dictionary 102 gives a pair of a set of source graphemes (e.g., "A", "C", "A", "D", "E", "M", "I" and "C) and a set of source phonemes (e.g., "AE2", "K", "AH0", "D", "EH1", "M", "IH0", and "K") for each word (e.g., English word "academic"). Each pair of the set of the source graphemes and the set of the source phonemes is used by the G2P converter learning module 120 as training data to train the G2P converter 110.

In the example shown in FIG. 3, the loanword dictionary 104 is a Japanese reading dictionary of English loanwords. The loanword dictionary 104 gives a pair of a set of source graphemes (e.g., "A", "C", "A", "D", "E", "M", "I" and "C) and a set of target phonemes (e.g., "a", "ka", "de", "mi", "Qku") for each loanword (e.g., English word "academic"). By combining, for each loanword, the pair of the set of the source graphemes and the set of the target phonemes with the aforementioned pair of the set of the source graphemes and the set of the source phonemes that is registered in the source language dictionary 102, a pair of the set of the source phonemes (e.g., "AE2", "K", "AH0", "D", "EH1", "M", "IH0", and "K") and the set of the target phonemes (e.g., "a", "ka", "de", "mi", "Qku") can be prepared for each loanword. Each pair of the set of the source phonemes and the set of the target phonemes is used by the P2P converter learning module 140 as training data to train the P2P converter 130.

The G2P converter learning module 120 is configured to train the G2P converter 110 by using the source language dictionary 102. The G2P converter 110 may be trained by using any standard algorithm such as a backpropagation through time (BPTT) algorithm.

The P2P converter learning module 140 is configured to train the P2P converter 130 by using the loanword dictionary 104 together with the source language dictionary 102. The source language dictionary 102 may be used to look up source phonemes for a given set of source graphemes. The P2P converter 130 may be trained by using any standard algorithm such as the BPTT algorithm.

In the grapheme-to-phoneme conversion system 100 shown in FIG. 1, by inputting a sequence of source graphemes of a given word (e.g., English word "abandoned") into the G2P converter 110, one best sequence of source phonemes (e.g., "AH", "B", "AE", "N", "D", "AH", "N" and "D") is obtained. Then, N best sequences of target phonemes (e.g., a sequence "a", "ba", "n", "da", "n", "do" and a sequence "a", "ba", "n", "a", "n", "do") are generated by the P2P converter 130 from the one best sequence of the source phonemes. Finally, one best sequence of the target phonemes (e.g., the sequence "a", "ba", "n", "da", "n", "do") is outputted from the scorer 150 as a result for the given word (e.g., English word "abandoned") by excluding more linguistically unacceptable sequence of the target phonemes (e.g., the sequence "a", "ba", "n", "a", "n", "do") from the result.

In another embodiment where one best sequence of target phonemes is generated by the P2P converter 130 from one sequence of source phonemes, the one best sequence of the target phonemes estimated for the given word may be outputted from the P2P converter 130.

In one embodiment, the module 110, 120, 130, 140 and 150 in the grapheme-to-phoneme conversion system 100 described in FIG. 1 may be implemented as, but not limited to, a software module including program instructions and/or data structures in conjunction with hardware components; as a hardware module including electronic circuitry; or as a combination thereof. The modules 110, 130 and 150 described in FIG. 1 may be implemented in a single or distributed computer system. The modules 120, 140 described in FIG. 1 may be implemented on the same computer system where the modules 110, 130 and 150 are implemented or other one or more computer systems. The dictionaries 102 and 104 may be provided by using any internal or external storage device or medium, to which the computer system can access.

Figure 4:
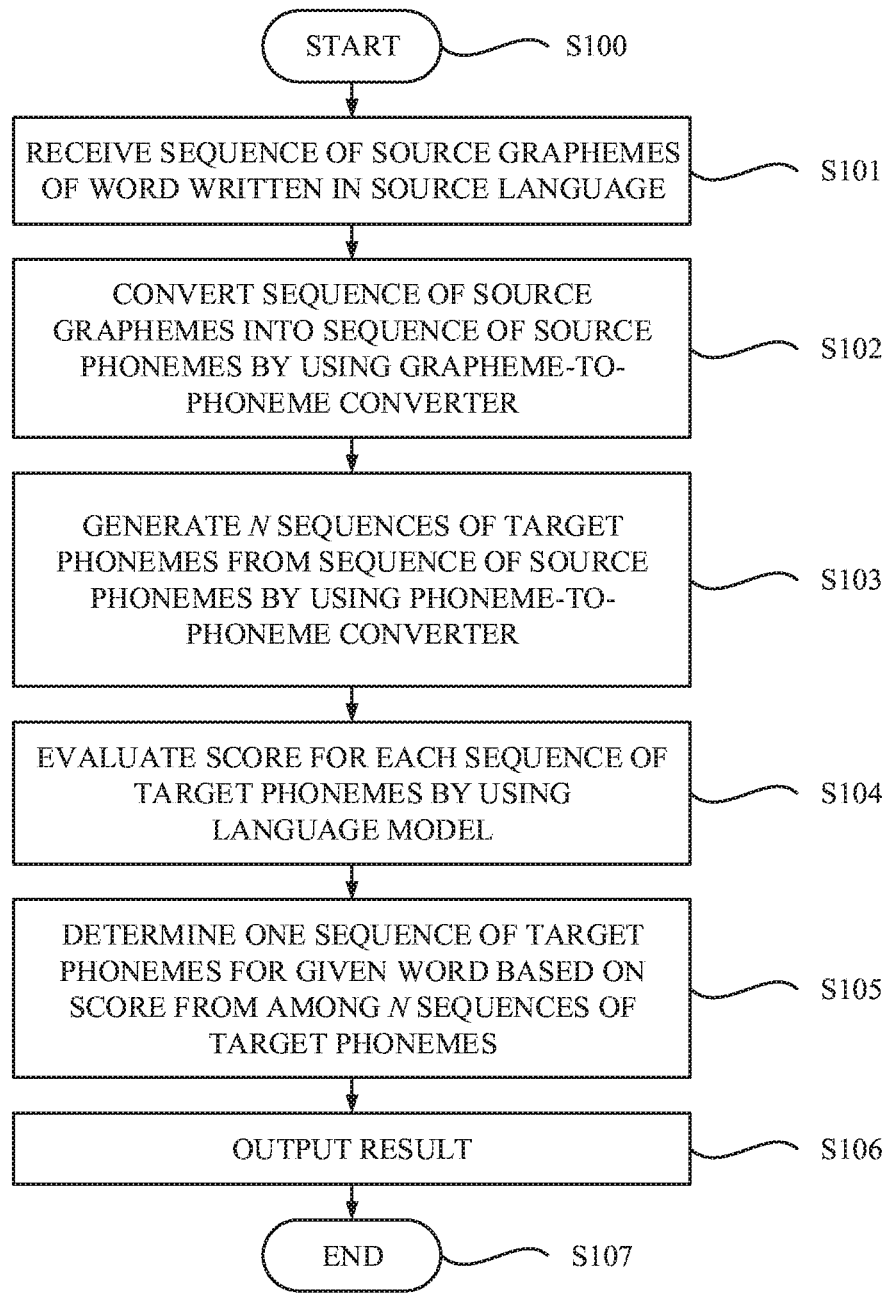
FIG. 4 is a flowchart depicting a process for estimating phonemes for a given word written in a different language according to an exemplary embodiment of the present invention.

Referring to FIG. 4, a process for estimating phonemes for a word written in a different language according to an exemplary embodiment of the present invention is shown. Note that the process shown in FIG. 4 may be executed by a processing unit that implements the G2P converter 110, the P2P converter 130 and the scorer 150 that are shown in FIG. 1.

The process shown in FIG. 4 may begin at step S100 in response to receiving a request for performing conversion. In Text-to-Speech (TTS) conversion, a sequence of source graphemes (a text) to be converted into the speech is given in the request. In Speech-to-Text (STT) conversion, a sequence of source graphemes (a text) of an unknown word in training data is given in the request.

At step S101, the processing unit may receive the sequence of source graphemes (text) of the given word written in a source language. At step S102, the processing unit may convert the sequence of the source graphemes into a sequence of source phonemes. The sequence of the source graphemes is converted by using the G2P converter 110.

At step S103, the processing unit may generate N sequences of target phonemes from the sequence of the source phonemes. The N sequences of the target phonemes are generated by using the P2P converter 130.

At step S104, the processing unit may evaluate a score for each sequence of the target phonemes by using the scorer 150. At step S105, the processing unit may determine one sequence of target phonemes for the given word based on the scores from among the N sequences of the target phonemes.

At step S106, the processing unit may output the one sequence for the given word, and the process may end at step S107. In Text-to-Speech (TTS) conversion, the obtained sequence of the target phonemes can be used to convert into a speech. In Speech-to-Text (STT) conversion, the obtained sequence of the target phonemes can be assigned to the unknown word in the training data.

According to one embodiment of the present invention, a sequence of target phonemes can be estimated for a word written in the source language with higher accuracy.

Generally, the source language dictionary 102, which gives readings of words in a phoneme system of the same language, is sufficiently large. On the other hand, the size of the loanword dictionary 104, which gives readings of words in a phoneme system of the different language, is not large. Hence, the accuracy of the direct conversion from source graphemes to target phonemes by using a sequence-to-sequence converter that has been trained using merely the loanword dictionary 104 is not sufficient.

In contrast, the novel grapheme-to-phoneme conversion functionality according to one embodiment of the present invention can estimate reasonable phonemes for a word written in the different language even when the size of the loanword dictionary 104 is not large. Dividing estimation process into multiple conversions makes it possible to leverage knowledge of the source language dictionary 102, which is generally abundant, thereby resulting in improvement on the accuracy of the overall estimation. The accuracy of the estimation can be improved by leveraging similarity between the source phonemes and the target phonemes.

In one embodiment where the scorer 150 is employed, the accuracy of the estimation is expected to be further improved since a linguistically unacceptable sequence of target phonemes that is generated from the sequence of the source phonemes can be excluded from the result.

In another embodiment where a sequence-to-sequence converter is used as the P2P converter 130, the accuracy of the conversion from source phonemes to target phonemes can be improved, which improves the accuracy of the overall estimation.

In yet another embodiment where a sequence-to-sequence converter is used as the G2P converter 110, the accuracy of the conversion from source graphemes to source phonemes can be improved, which improves the accuracy of the overall estimation.

Note that a combination of languages to which the novel grapheme-to-phoneme conversion functionality can be applicable is not limited to the aforementioned example (i.e. English (source) and Japanese (target)). Any combination of languages selected from a group consisting of Arabic, Chinese, English, French, German, Japanese, Korean, Portuguese, Russian, Spanish, may be employed. For example, a combination of one of Indo-European languages (e.g. English, French, Spanish, etc.) and one of East Asian languages (e.g., Chinese, Korean, Japanese, etc.) may be employed. For another example, a combination of two of Indo-European languages (e.g. English, French, Spanish, etc.) may also be employed. The novel conversion functionality can be applied to such source language that can appear in the context with original language notation like Japanese.

Hereinafter, referring to the series of FIGS. 5-7, a computer system and a method for estimating graphemes of a word from phonemes in a different language according to one embodiment of the present invention are described.

Figure 5:
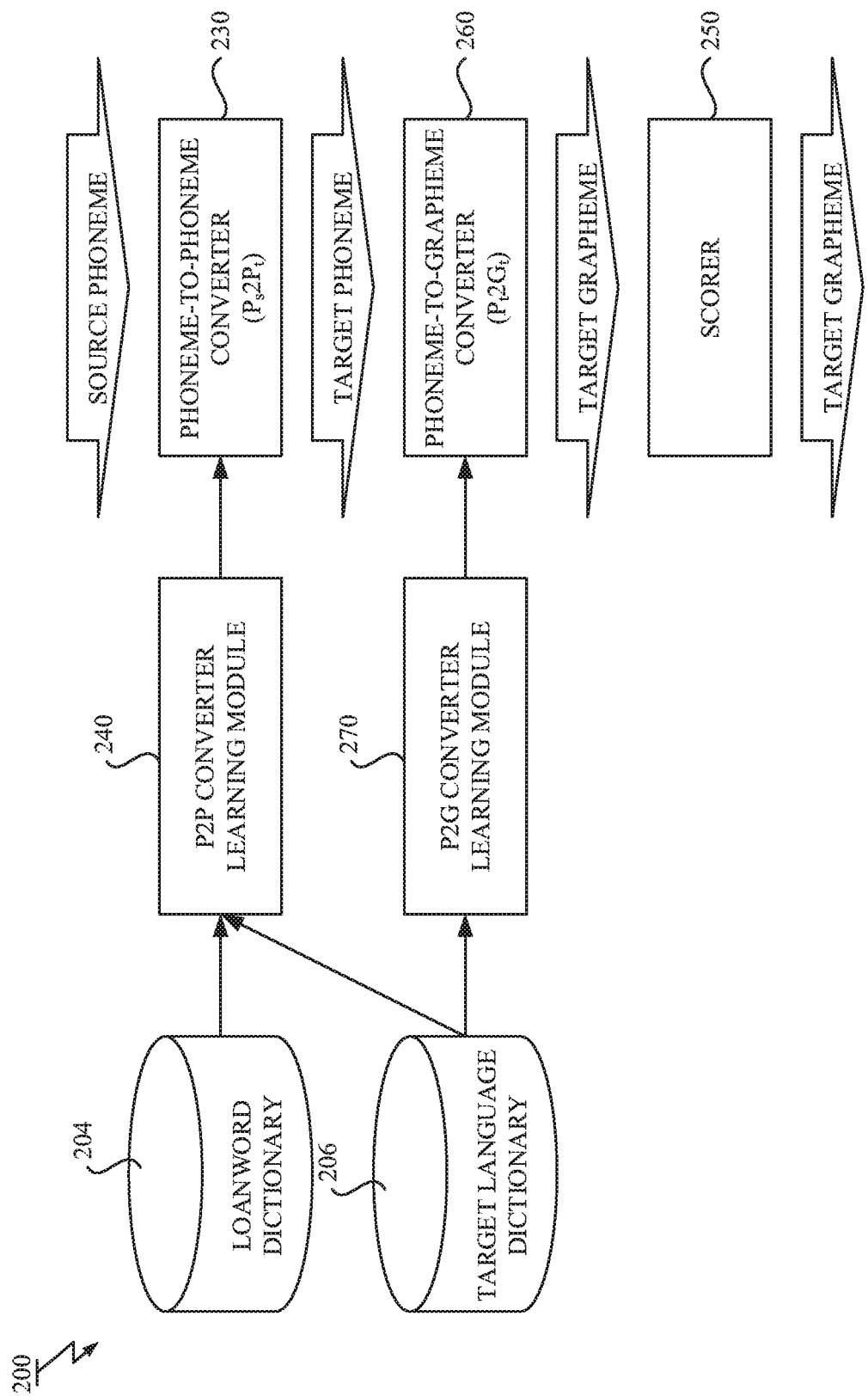
FIG. 5 illustrates a block diagram of a phoneme-to-grapheme conversion system according to other exemplary embodiment of the present invention.

With reference to FIG. 5, there is described a block diagram of a phoneme-to-grapheme conversion system 200 according to one embodiment of the present invention. As shown in FIG. 5, the phoneme-to-grapheme conversion system 200 may include a phoneme-to-phoneme (P2P) converter 230 for converting phonemes in a source language (hereinafter, referred to as "source phonemes") into phonemes in a target language (hereinafter, referred to as "target phonemes"); a phoneme-to-grapheme (P2G) converter 260 for converting target phonemes into graphemes in the target language (hereinafter, referred to as "target graphemes"); and a scorer 250 for scoring one or more sequences of target graphemes obtained from the P2G converter 260 to determine one plausible sequence of target graphemes as a result.

The P2P converter 230 may be a sequence-to-sequence converter that is configured to convert a sequence of source phonemes into a sequence of target phonemes. The P2P converter 230 receives a given sequence of source phonemes and generates one or more sequences of target phonemes from the sequence of the source phonemes. In one embodiment, one best sequence of target phonemes is generated from the given sequence of the source phonemes. However, in another embodiment, N best sequences of target phonemes may be generated. The sequence of the target phonemes generated by the P2P converter 230 is passed to the P2G converter 260.

The P2G converter 260 may be a sequence-to-sequence converter that is configured to convert a sequence of target phonemes into a sequence of target graphemes. The P2G converter 260 receives the sequence of the target phonemes from the P2P converter 230 and converts the sequence of the target phonemes into one or more sequences of target graphemes. The one or more sequences of the target graphemes generated by the P2G converter 260 are passed to the scorer 150. In one embodiment, N best sequences of target graphemes are generated from one sequence of target phonemes. However, in another embodiment, one best sequence of target graphemes may be generated from one sequence of target phonemes.

The scorer 250 is a language model of the target language, and is configured to score one or more sequences of target graphemes obtained from the P2G converter 260 and to identify one plausible sequence of the target graphemes as a target word written in the target language as a result for the sequence of the phonemes in the source language. In one embodiment, the language model can be created from writings registered in a dictionary of the target language and evaluate likelihood of writing in the target language. The scorer 250 evaluates a score for each sequence of target graphemes. The scorer 250 outputs occurrence probability of a given sequence of target graphemes as the score. Lower probability indicates that the sequence of the target graphemes is more linguistically unacceptable. The evaluated score for each sequence is used to determine the one best sequence for the given sequence of source phonemes from among the one or more sequences. In one embodiment, the language model of the scorer 250 is a neural network based model such as a RNN language model.

Further referring to FIG. 5, the phoneme-to-grapheme conversion system 200 may further include a loanword dictionary 204 that registers relationship between a set target graphemes and a set of source phonemes for each loanword; a target language dictionary 206 that registers relationship between a set of target graphemes and a set of target phonemes for each word; a P2P converter learning module 240 for learning the P2P converter 230 by using the loanword dictionary 204 together with the target language dictionary 206; and a P2G converter learning module 270 for learning the P2G converter 260 by using the target language dictionary 206.

Figure 6:
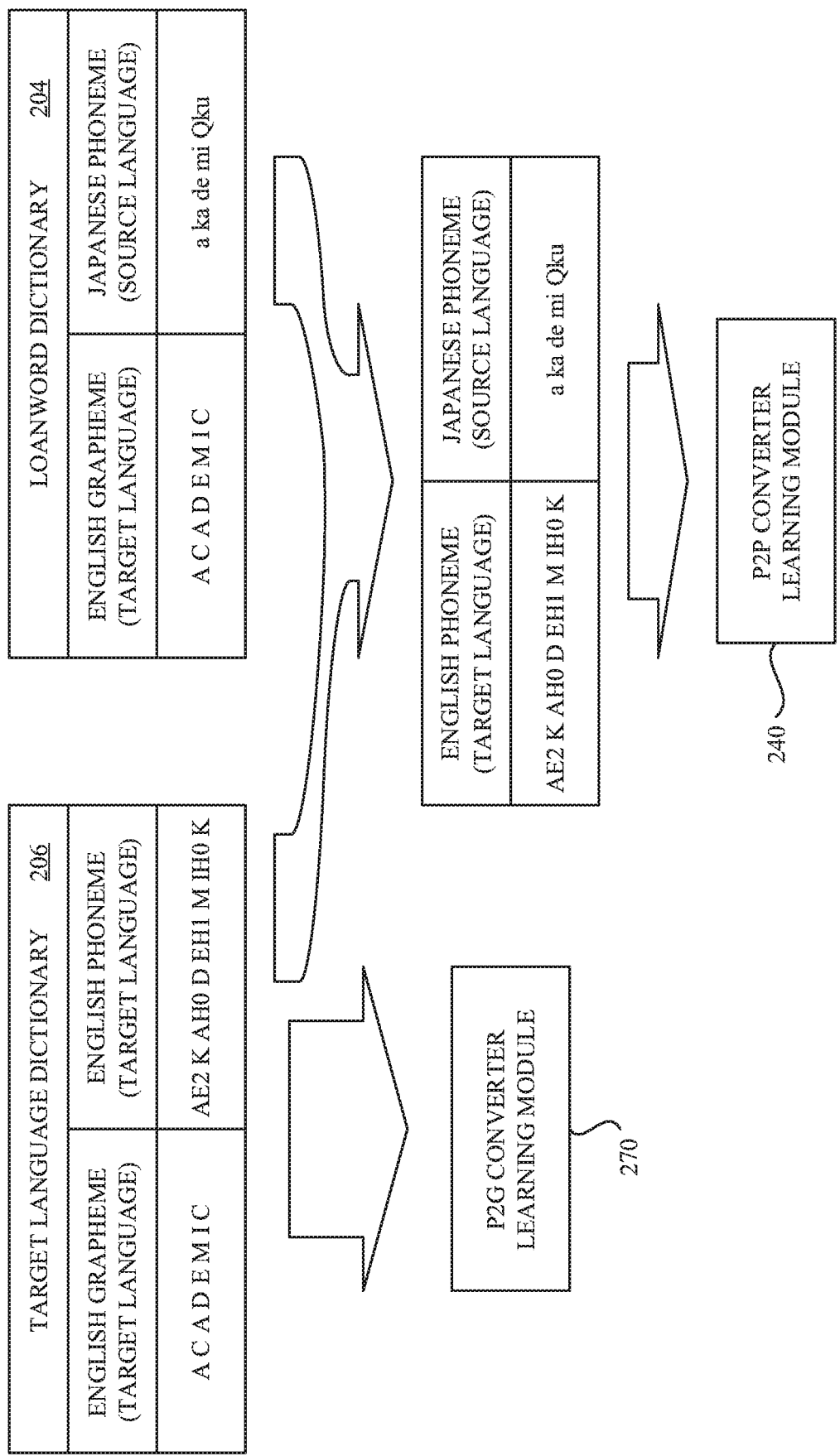
FIG. 6 describes a way of preparing training data for converters in the phoneme-to-grapheme conversion system according to the other exemplary embodiment of the present invention.

With reference to FIG. 6, a way of preparing training data for sequence-to-sequence converters is described. In the example shown in FIG. 6, the target language dictionary 206 is an English reading dictionary of English words. The loanword dictionary 204 is a Japanese reading dictionary of English loanwords. By combining, for each loanword, the pair of the set of the target graphemes and the set of the source phonemes with the pair of the set of the target graphemes and the set of the target phonemes registered in the target language dictionary 206, a pair of the set of the target phonemes (e.g., "AE2", "K", "AH0", "D", "EH1", "M", "IH0", and "K") and the set of the source phonemes (e.g., "a", "ka", "de", "mi", "Qku") can be prepared for each loanword. Each pair of the set of the target phonemes and the set of the source phonemes is used by the P2P converter learning module 240 as training data to train the P2P converter 230. The P2G converter learning module 270 is configured to train the P2G converter 260 by using the target language dictionary 206. Note that the target language dictionary 206 can be used to create the language model of the target language for the scorer 250.

In the phoneme-to-grapheme conversion system 200 shown in FIG. 5, by inputting a given sequence of source phonemes (e.g., the sequence "a", "ba", "n", "da", "n", "do" that may be easily obtained from a text of a phonogram such as katakana or hiragana in Japanese) into the P2P converter 230, the estimated sequence of the target graphemes of a target word (e.g., English word "abandoned") is outputted from the scorer 250 as a result for the given sequence of the source phonemes.

In one embodiment, the module 230, 240, 250, 260 and 270 in the phoneme-to-grapheme conversion system 200 described in FIG. 5 may be implemented as, but not limited to, a software module in conjunction with hardware components; as a hardware module including electronic circuitry; or as a combination thereof.

Figure 7:
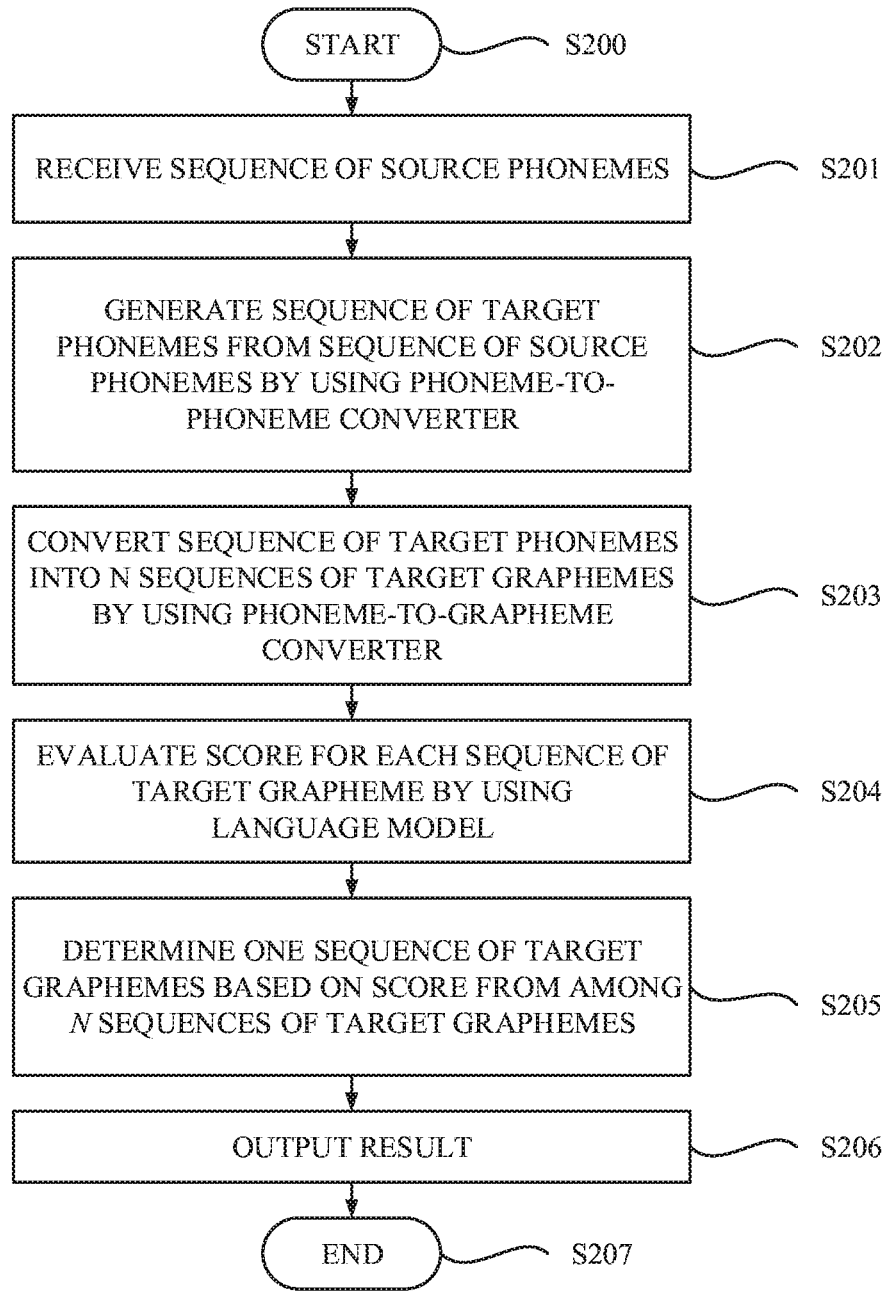
FIG. 7 is a flowchart depicting a process for estimating graphemes for phonemes in a different language according to other exemplary embodiment of the present invention.

Referring to FIG. 7, a process for estimating graphemes for phonemes in a different language according to other exemplary embodiment of the present invention is shown. Note that the process shown in FIG. 7 may be executed by a processing unit that implements the P2P converter 230, the P2G converter 260 and the scorer 250 that are shown in FIG. 5.

The process shown in FIG. 7 may begin at step S200 in response to receiving a request for performing conversion. In a particular example, a rough reading of a target word in the source language (a sequence of source phonemes) is given in the request.

At step S201, the processing unit may receive the given sequence of the source phonemes. At step S202, the processing unit may generate at least one sequence of target phonemes from the given sequence of the source phonemes. One best sequence of target phonemes may be generated by using the P2P converter 230. The sequence of the target phonemes is generated by using the P2P converter 230. At step S203, the processing unit may convert at least one sequence of the target phonemes into at least one sequence of target graphemes. N sequences of the target graphemes may be generated by using the P2G converter 260.

At step S204, the processing unit may evaluate a score for each sequence by using the scorer 250. At step S205, the processing unit may identify one sequence of target graphemes as a target word written in the target language based on the scores from among the N sequences of the target graphemes. The score for each sequence is used to determine the one sequence from among the plurality of the sequences.

At step S206, the processing unit may output the one sequence as a result for the given sequence of the source phonemes and the process may end at step S207. The spell of the target word written in the target language can be identified from the rough reading of the target word in the source language.

According to the aforementioned embodiment of the present invention, a sequence of target graphemes can be estimated from source phonemes with higher accuracy even when the size of the available dictionary is relatively small.

Note that a combination of languages to which the novel phoneme-to-grapheme conversion functionality can be applicable is not limited to the aforementioned example (i.e. Japanese (source) and English (target)). Any combination of languages selected from a group consisting of Arabic, Chinese, English, French, German, Japanese, Korean, Portuguese, Russian, Spanish, can be employed.

In one embodiment, a program implementing the grapheme-to-phoneme conversion system 100 shown in FIG. 1 except for the scorer 150 and the process shown in FIG. 4 except for the steps S104 and S105 according to the exemplary embodiment was coded. The number N of sequences of the target phonemes generated by using the P2P converter 130 at step S103 was one. Instead of performing the steps S104 and S105 shown in FIG. 4, the processing unit determined the one best sequence of the target phonemes as a result for the given word, directly. An encoder-decoder LSTM (Long and Short Term Memory) model with two layers was employed as architecture of the sequence-to-sequence neural network models.

The G2P converter 110 that converts a sequence of English graphemes into a sequence of English phonemes ($G_{ENG}2P_{ENG}$ converter) was trained by using an English reading dictionary. The number of the English words registered in the English reading dictionary was 114,414. Thus, the number of the training data for the $G_{ENG}2P_{ENG}$ converter was 114,414.

The P2P converter 130 that converts a sequence of English phonemes into a sequence of Japanese phonemes ($P_{ENG}2P_{JP}$ converter) was trained by using the English reading dictionary and a manually built Japanese reading dictionary of English loanwords. The Japanese reading of the English loanword was made by hand to build the Japanese reading dictionary. The number of the words registered in the Japanese reading dictionary was 3156. The 3156 words registered in the Japanese reading dictionary was also registered in the English reading dictionary. The English reading dictionary was used to look up English phonemes for corresponding Japanese phonemes. Thus, the number of the training data for the $P_{ENG}2P_{JP}$ converter was 3156.

As for Example, the P2P converter 130 was connected to the G2P converter 110 to form a novel grapheme-to-phoneme converter that converts a sequence of English graphemes into a sequence of Japanese phonemes via English phonemes by plural conversion ($G_{ENG}2P_{ENG}2P_{JP}$ converter).

As for Comparative Examples, a G2P converter that directly converts a sequence of English graphemes into a sequence of Japanese phonemes ($G_{ENG}2P_{JP}$ converter) was trained by using the English reading dictionary and the Japanese reading dictionary. The number of the training data for the $G_{ENG}2P_{JP}$ converter was 3156.

Accuracy of each trained converter was evaluated for test data having 351 words. PER (Phoneme Error Rate) was used as a metric for the performance. The evaluated results of the Example and the Comparative example are summarized with intermediate results as follow:

| Conditions | # of Training data | # of Test data | PER[%] |
| --- | --- | --- | --- |
| $G_{ENG}2P_{ENG}$ | 114414 | 351 | 9 |
| $G_{ENG}2P_{JP}$ (Comparative Example) | 3156 | 351 | 38.6 |
| $P_{ENG}2P_{JP}$ | 3156 | 351 | 29.3 |
| $G_{ENG}2P_{ENG}2P_{JP}$ (Example) | 114414 (first part) 3156 (latter part) | 351 | 34.8 |

As shown in the table, the performance of the $G_{ENG}2P_{ENG}$ converter and the $P_{ENG}2P_{JP}$ converter were 9.0% PER and 29.3% PER in accuracy, respectively. The performance of the novel English grapheme to Japanese phonemes converter $G_{ENG}2P_{ENG}2P_{JP}$ was 34.8% PER that relatively improved 9.8% in accuracy in comparison with the direct English grapheme to Japanese phonemes converter $G_{ENG}2P_{JP}$. It can be also understood that the accuracy of converting from the reading to the reading across different language is higher than the accuracy of converting from the writing to the reading by comparing the performance of the $P_{ENG}2P_{JP}$ converter with the $G_{ENG}2P_{JP}$ converter. It was demonstrated that the novel grapheme-to-phoneme converter of the Example ($G_{ENG}2P_{ENG}2P_{JP}$) can estimate a sequence of target graphemes for a word written in source language with higher accuracy in comparison with direct conversion of the Comparative Example ($G_{ENG}2P_{JP}$).

Figure 8:
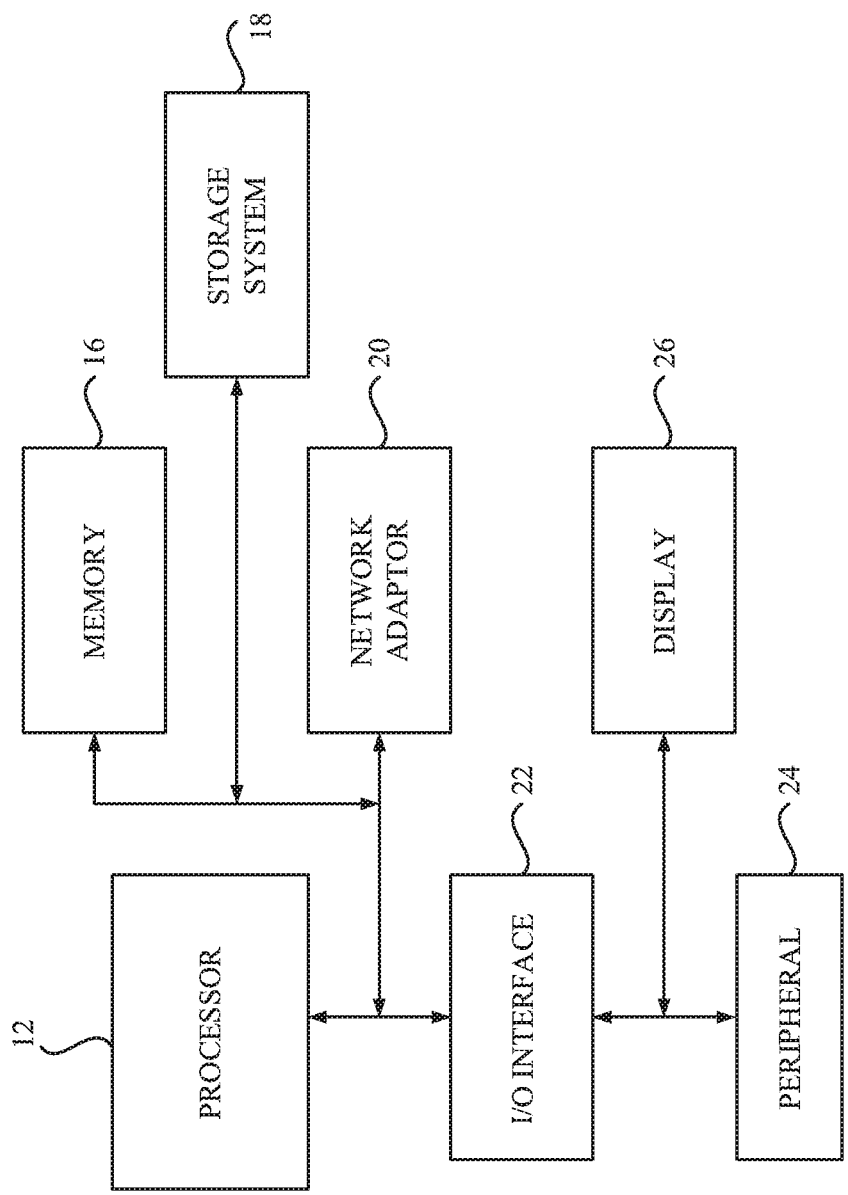
FIG. 8 depicts a computer system according to one or more embodiments of the present invention.

Referring now to FIG. 8, a schematic of an example of a computer system 10, which can be used for the grapheme-to-phoneme conversion system 100 or the phoneme-to-grapheme conversion system 200, is shown. The computer system 10 shown in FIG. 8 is implemented as computer system. The computer system 10 is only one example of a suitable processing device and is not intended to suggest any limitation as to the scope of use or functionality of embodiments of the invention described herein. Regardless, the computer system 10 is capable of being implemented and/or performing any of the functionality set forth hereinabove.

The computer system 10 is operational with numerous other general purpose or special purpose computing system environments or configurations. Examples of well-known computing systems, environments, and/or configurations that may be suitable for use with the computer system 10 include, but are not limited to, personal computer systems, server computer systems, thin clients, thick clients, handheld or laptop devices, in-vehicle devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 10 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 8, the computer system 10 is shown in the form of a general-purpose computing device. The components of the computer system 10 may include, but are not limited to, a processor (or processing unit) 12 and a memory 16 coupled to the processor 12 by a bus including a memory bus or memory controller, and a processor or local bus using any of a variety of bus architectures.

The computer system 10 typically includes a variety of computer system readable media. Such media may be any available media that is accessible by the computer system 10, and it includes both volatile and non-volatile media, removable and non-removable media.

The memory 16 can include computer system readable media in the form of volatile memory, such as random access memory (RAM). The computer system 10 may further include other removable/non-removable, volatile/non-volatile computer system storage media. By way of example only, the storage system 18 can be provided for reading from and writing to a non-removable, non-volatile magnetic media. As will be further depicted and described below, the storage system 18 may include at least one program product having a set (e.g., at least one) of program modules that are configured to carry out the functions of embodiments of the invention.

Program/utility, having a set (at least one) of program modules, may be stored in the storage system 18 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

The computer system 10 may also communicate with one or more peripherals 24 such as a keyboard, a pointing device, an audio system, etc.; a display 26; one or more devices that enable a user to interact with the computer system 10; and/or any devices (e.g., network card, modem, etc.) that enable the computer system 10 to communicate with one or more other computing devices. Such communication can occur via Input/Output (I/O) interfaces 22. Still yet, the computer system 10 can communicate with one or more networks such as a local area network (LAN), a general wide area network (WAN), and/or a public network (e.g., the Internet) via the network adapter 20. As depicted, the network adapter 20 communicates with the other components of the computer system 10 via bus. It should be understood that although not shown, other hardware and/or software components could be used in conjunction with the computer system 10. Examples, include, but are not limited to: microcode, device drivers, redundant processing units, external disk drive arrays, RAID systems, tape drives, and data archival storage systems, etc.

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for estimating phonemes for a loanword written in a different language for Text-to-Speech (TTS) or Speech-to-Text (STT) conversion, by executing program instructions, the computer system comprising:
    a memory tangibly storing the program instructions; and
    a processor in communications with the memory for executing the program instructions, wherein the processor is configured to:
        receive a sequence of source graphemes corresponding to text of a given loanword in a source language;
        convert, via a first converter, the sequence of source graphemes into a sequence of source phonemes corresponding to speech of the given loanword in the source language;
        generate a plurality of candidate sequences of target phonemes corresponding to speech of the given loanword in a target language by converting, via a second converter, the sequence of source phonemes using a neural network model, the neural network model being trained by employing a loanword dictionary combined with a source language dictionary, the source language dictionary feeding both the first and second converters and the loanword dictionary feeding only the second converter to divide the estimation into two conversions;
        generate, by using a recurrent neural network language model of the target language trained by a backpropagation through time (BPTT) algorithm, a score corresponding to an occurrence probability associated with linguistic acceptability for each of a plurality of candidate sequences of target phonemes with respect to the target language; and
        determine at least one sequence of target phonemes for the given loanword by excluding one or more sequences of target phonemes from the plurality of candidate sequences of target phonemes that are determined to be linguistically unacceptable based on a comparison of each score to a threshold.

2. The computer system of claim 1, wherein the sequence of source graphemes is converted by a first sequence-to-sequence converter into the sequence of source phonemes, and the neural network model is a second sequence-to-sequence converter for converting the sequence of source phonemes into the plurality of candidate sequences of target phonemes.

3. The computer system of claim 2, wherein the first sequence-to-sequence converter is trained by using the source language dictionary.

4. The computer system of claim 1, wherein the loanword dictionary registers a relationship between a set of source graphemes in the source language and a set of target phonemes in the target language for each word, and the source language dictionary registers a relationship between the set of source graphemes and a set of source phonemes in the source language for each word.

5. A computer system for estimating graphemes of a loanword from phonemes in a different language, by executing program instructions for Text-to-Speech (TTS) or Speech-to-Text (STT) conversion, the computer system comprising:
a memory tangibly storing the program instructions;
a processor in communications with the memory for executing the program instructions, wherein the processor is configured to:
receive a sequence of source phonemes corresponding to speech in a source language;
convert, via a first converter, the sequence of source graphemes into a sequence of source phonemes;
generate a plurality of candidate sequences of target phonemes corresponding to speech in a target language by converting, via a second converter, the sequence of source phonemes using a neural network model, the neural network model being trained by employing a loanword dictionary combined with a target language dictionary, the source language dictionary feeding both the first and second converters and the loanword dictionary feeding only the second converter to divide the estimation into two conversions;
convert, via a third converter, the plurality of candidate sequences of target phonemes into respective ones of a plurality of sequences of target graphemes corresponding to text in the target language;
generate, by using a recurrent neural network language model of the target language trained by a backpropagation through time (BPTT) algorithm, a score corresponding to an occurrence probability associated with linguistic acceptability for each sequence of target graphemes with respect to the target language; and
identify at least one target loanword written in the target language for the sequence of source phonemes by excluding one or more sequences of target graphemes from the plurality of sequences of target graphemes that are determined to be linguistically unacceptable based on a comparison of each score to a threshold.

6. The computer system of claim 5, wherein the neural network model is a third sequence-to-sequence converter for converting the sequence of source phonemes into the plurality of candidate sequences of target phonemes, and the plurality of candidate sequences of target phonemes is converted by a fourth sequence-to-sequence converter into the plurality of sequences of target graphemes.

7. The computer system of claim 6, wherein the fourth sequence-to-sequence converter is trained by using the target language dictionary.

8. The computer system of claim 5, wherein the loanword dictionary registers a relationship between a set of target graphemes in the target language and a set of source phonemes in the source language for each word, and the target language dictionary registers a relationship between the set of target graphemes and a set of target phonemes in the target language for each word.

9. A computer program product for estimating phonemes for a loanword written in a different language for Text-to-Speech (TTS) or Speech-to-Text (STT) conversion, the computer program product comprising a computer readable storage medium having program instructions embodied therewith, the program instructions executable by a computer to cause the computer to perform the method comprising:
receiving a sequence of source graphemes corresponding to text of a given loanword in a source language;
converting, via a first converter, the sequence of source graphemes into a sequence of source phonemes corresponding to speech of the given loanword in the source language;
generating a plurality of candidate sequences of target phonemes corresponding to speech of the given loanword in a target language, including converting, via a second converter, the sequence of source phonemes by using a neural network model, the neural network model being trained by employing a loanword dictionary combined with a source language dictionary, the source language dictionary feeding both the first and second converters and the loanword dictionary feeding only the second converter to divide the estimation into two conversions;
generating, by using a recurrent neural network language model of the target language trained by a backpropagation through time (BPTT) algorithm, a score corresponding to an occurrence probability associated with linguistic acceptability for each of a plurality of candidate sequences of target phonemes with respect to the target language; and
determining at least one sequence of target phonemes for the given loanword by excluding one or more sequences of target phonemes from the plurality of candidate sequences of target phonemes that are determined to be linguistically unacceptable based on a comparison of each score to a threshold.

10. The computer program product of claim 9, wherein the sequence of source graphemes is converted by a first sequence-to-sequence converter into the sequence of source phonemes, and the neural network model is a second sequence-to-sequence converter for converting the sequence of source phonemes into the plurality of candidate sequences of target phonemes.

11. The computer program product of claim 10, wherein the first sequence-to-sequence converter is trained by using the source language dictionary.

12. The computer program product of claim 9, wherein the loanword dictionary registers a relationship between a set of source graphemes in the source language and a set of target phonemes in the target language for each word, and the source language dictionary registers a relationship between the set of source graphemes and a set of source phonemes in the source language for each word.

* * * * *